US007206282B1

(12) United States Patent
Goldman et al.

(10) Patent No.: US 7,206,282 B1
(45) Date of Patent: Apr. 17, 2007

(54) METHOD AND APPARATUS TO BALANCE FLOW LOADS IN A MULTIPURPOSE NETWORKING DEVICE

(75) Inventors: Tomasz J. Goldman, Hellerup (DK); Christian Paulsen, Søborg (DK)

(73) Assignee: F5 Networks, Inc., Seattle, WA (US)

( * ) Notice: Subject to any disclaimer, the term of this patent is extended or adjusted under 35 U.S.C. 154(b) by 754 days.

(21) Appl. No.: 09/870,252

(22) Filed: May 29, 2001

(51) Int. Cl.
*G01R 31/08* (2006.01)

(52) U.S. Cl. .................. 370/230; 370/235; 370/395.42

(58) Field of Classification Search ............... 370/229, 370/231, 232, 235, 230, 395.21, 341, 431; 455/453, 450, 452.1, 452.2, 509
See application file for complete search history.

(56) References Cited

U.S. PATENT DOCUMENTS

| | | | |
|---|---|---|---|
| 6,092,115 A * | 7/2000 | Choudhury et al. ........ 709/235 |
| 6,260,072 B1 * | 7/2001 | Rodriguez-Moral ........ 709/241 |
| 6,570,876 B1 * | 5/2003 | Aimoto ...................... 370/389 |
| 6,574,195 B2 * | 6/2003 | Roberts ...................... 370/235 |
| 6,594,268 B1 * | 7/2003 | Aukia et al. ................ 370/400 |
| 6,614,790 B1 * | 9/2003 | Veres et al. .............. 370/395.2 |
| 6,633,544 B1 * | 10/2003 | Rexford et al. ............. 370/238 |
| 6,741,608 B1 * | 5/2004 | Bouis et al. ................ 370/465 |
| 6,744,767 B1 * | 6/2004 | Chiu et al. ............. 370/395.21 |
| 6,816,494 B1 * | 11/2004 | Raza ..................... 370/395.41 |
| 6,977,931 B1 * | 12/2005 | Hadziomerovic ........... 370/392 |
| 7,027,393 B1 * | 4/2006 | Cheriton .................. 370/230.1 |

* cited by examiner

*Primary Examiner*—Phirin Sam
(74) *Attorney, Agent, or Firm*—Darby & Darby PC; John W. Branch

(57) ABSTRACT

A method and apparatus for allocating access to a scarce resource. A load of each flow on the resource is calculated. The aggregate load is compared to a maximum steady state load. A drop policy is established responsive to the comparison. The drop policy is applied to the flows at an input interface of the device.

27 Claims, 4 Drawing Sheets

METHOD AND APPARATUS TO BALANCE FLOW LOADS IN A MULTIPURPOSE NETWORKING DEVICE

BACKGROUND

1. Field of the Invention

The invention relates to networking. More specifically, the invention relates to traffic control in a distributed network.

2. Background

Routers in a traditional distributed network typically perform a routing function for a plurality of clients. Each client may send packets to be routed out over the internet, for example. A routing function is primarily a passthrough function and is dependent on egress bandwidth. When more packets come in than the router is able to send out during a particular time window, the packets are queued at the output of the router to wait for an available sending opportunity. If a backup in the pipe is sufficient that the queue reaches a predetermined threshold, the router institutes a drop policy to drop packets at the output interface when the queue is too full. Among the known drop policies are: Dynamic Window, Slow Start, and Nagles Algorithm. While these policies work satisfactorily, where, as in this example, the only resource at issue is output bandwidth, they are not satisfactory for allocation of other scarce resources, such as, Central Processing Unit (CPU) time in a multipurpose networking device.

A multipurpose network device such as, for example, a combination router and file server performs, Transmission Control Protocol/Internet Protocol (TCP/IP) routing functions, file server functions, management functions, and other activities based on incoming packets. These various activities must compete for shared resources within the device. As noted above, among the scarce shared resources are CPU time. While traditional systems allocate CPU time by task prioritization, task prioritization does not consistently provide desired and predictable performance.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

While the discussion below is primarily in the context of balancing the load imposed on a processor by various data flows, the discussion can be generalized to any scarce resource. Such generalization is within the scope and contemplation of the invention.

Figure 1A:
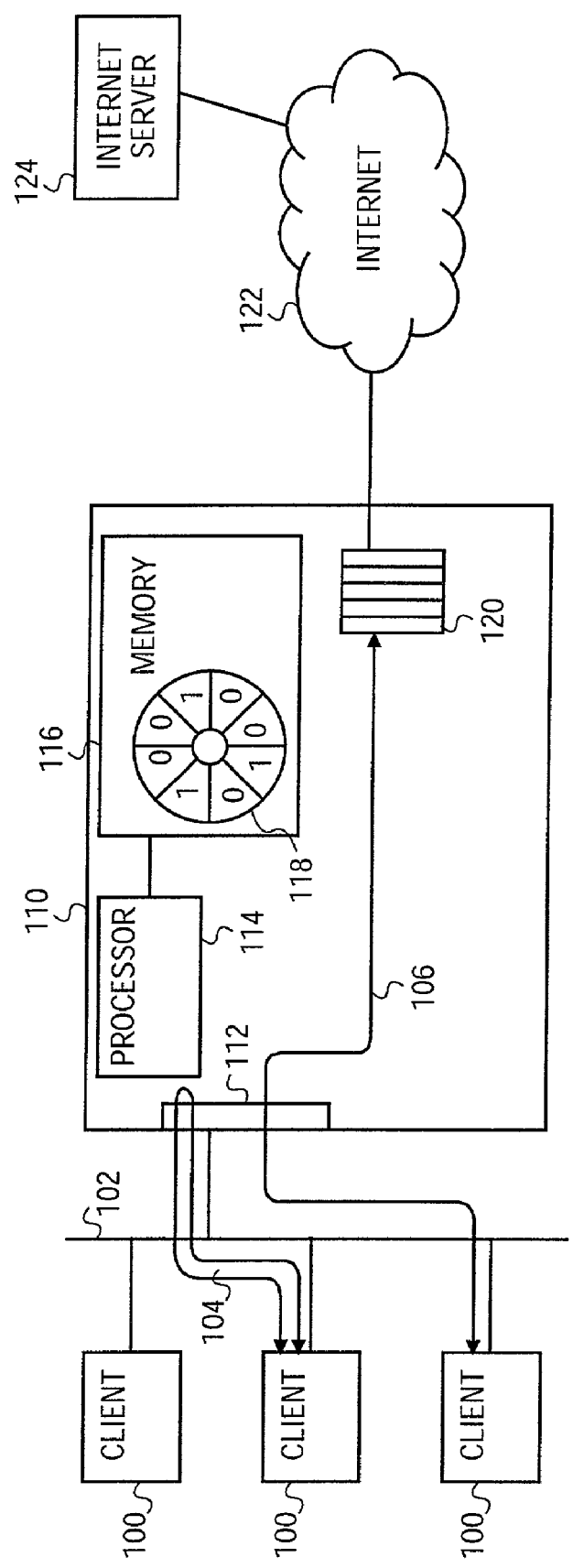
FIG. 1a is a block diagram of the system of one embodiment of the invention.

FIG. 1a is a block diagram of the system of one embodiment of the invention. A multipurpose network element 110 is coupled via a local area network (LAN) 102 to a plurality of clients 100. Clients 100 send both passthrough flows such as a flow including traffic stream 106 for which network element 110 may perform routing functions and flows to be handled internally by the element 110, such as one including traffic stream 104. These may include control flows, file server flows, etc. In one embodiment, typical traffic is in one form of Transmission Control Protocol/Internet Protocol (TCP/IP) packets.

Multipurpose device 110 includes a processor 114 coupled to a memory 116. Processor 114 handles the processing required for the various types of flows between the device and the outside world. The memory 116, may be for example, a read only memory (ROM). In one embodiment, the memory 116 stores one or more drop buffers 118 to implement a drop policy when the processor 114 is over utilized. The device 110 also includes an input interface 112 through which all flows from the client 100 to the device 110 flow. An output interface including an output queue 120 is provided for passthrough flows, such as, flow 106 to pass on to a distributed network, such as internet 122. Any number of other devices may be coupled to internet 122 including, for example, an internet server 124.

As used herein, a "flow" is deemed to be an aggregation of packets of a particular type or category regardless of source. Thus, if two different clients were sending packets directed to internet 122, the packets from both clients would constitute one passthrough flow. It is desirable that all flows have some guaranteed Central Processing Unit (CPU) time to avoid starvation of the associated activity. Different types of packets will have different costs in terms of processor time required to service them. The packet load on the system depends on a number of factors. As noted above, one major distinction is between pass through flows (packets received by the network element 110) at one interface and passed through to another interface of network element 110 and flows to be handled internal to network element 110. Packets to be handled internally can further be differentiated between i) control and management packets used by a remote operator who monitors the system; and ii) packets to a file server within network element 110. Accordingly, a non-exclusive list of packets expected in one embodiment includes: i) packets routed through the network element without encryption; ii) packets routed through the network element with encryption; iii) management and control packets; and iv) packets addressed to the file server.

In one embodiment, the cost is used as a scaling factor to normalize the load of a flow or the processor 114. The system load is given by the equation $\vec{L}=(L_1, L_2 \ldots L_N)$ where there are N flows, and N is an arbitrarily large number. The load in packets per second (pps) for each flow $F_i$ is given by the equation $L_i=C_i \times I_i$ where $I_i$ is the input rate in pps and $C_i$ is the cost scaling factor. Thus, $L_i$ is express in normalized pps.

To avoid over utilization of the scarce resource (here CPU time) $\Sigma_i L_i = L \leq P$ where P is the threshold processing rate measured in normalized pps. An ideal steady state for the system is given by the load vector $\vec{P}=(P_1, P_2, \ldots P_N)$ such that $\Sigma_i P_i = P$. The processor is over utilized when L>P and a particular flow is excessive when $L_i > P_i$, A particular flow is under utilized if $L_i < P_i$. When a flow is under utilized, a portion of its share may be allocated to an excessive flow such that as long as $P \geq L$ all packets will be serviced. This share that may be reallocated is computed as a sum of flows over-utilizing their shares and unused capacity in flows under-utilizing their shares and is given by $$\sum_{L_i > P_i} P_i + \sum_{L_i \leq P_i} L_i$$

$(P_i - L_i) = S$. When the processor is over utilized, i.e., L>P, the excessive flow is scaled to bring $L \leq P$. An appropriate scale factor is given by $$\frac{S}{\sum_{L_i > P_i} L_i} = K.$$

Figure 1B:
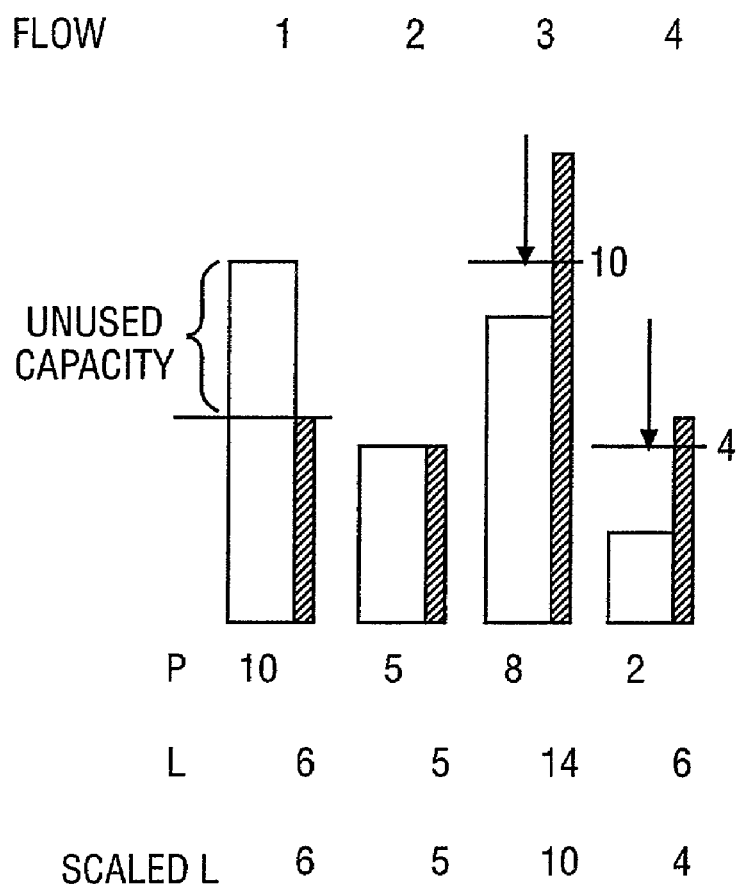
FIG. 1b is a bar diagram reflecting an example of load balancing in one embodiment of the invention.

FIG. 1b is a bar diagram reflecting an example of load balancing in one embodiment of the invention. In this diagram, four flows are shown. Flow 1 has an allocated maximum steady state of ten packets, flow 2 has five packets, flow 3 has eight packets and flow 4 has two packets. Thus, P for this system is twenty-five. The load for flow 1 is six packets, for flow 2 is five packets, for flow 3 is fourteen packets and for flow 4 is six packets. Thus, the aggregate load L is thirty-one. This reflects an overloaded condition. Looking to the individual flows, flow 1 has an unused capacity of 4 packets, flow 3 has excessive usage of 6 packets and flow 4 has an over usage of 4 packets. The appropriate scaling factor calculated using the equation set forth above is [(8+2)+4]/(14+6)=0.7. This indicates that flow 3 should be scaled down to ten packets and flow 4 should be scaled down to four packets. The numbers are arrived at using the scaling factor and an integer function, e.g., int (14×0.7)=int (9.8)=10. Alternatively, a floor function could be used to make absolutely certain that the scaled load does not result in an overloaded condition. For example, floor (14×0.7)=floor (9.8)=9. The integer function rounds to nearest integer while the floor function rounds to a next smaller integer.

To implement this scaling, a drop policy could be employed in which four consecutive packets from flow 3 and two packets from flow 4 are dropped. However, it is desirable to employ a random or pseudorandom (or simulated random) drop policy to avoid synchronization of multiple sources. A drop schedule is a function of K and the current load $L_i$. Thus, the reduction factor is given by $R_i = L_i \times (1-K)$. In one embodiment, the drop factor may be implemented as a cyclic buffer such as, drop buffer 118, in which a "1" indicates a packet drop and a 0 indicates the packet is serviced. After the drop or service decision is made, a drop schedule pointer is advanced to the next location in the drop buffer 118. In one embodiment, all drop schedules are based on a number of packets dropped out of eight possible packets. Thus, eight separate drop buffers may be retained in memory 116 and an appropriate one for the selected scaling factor is selected from the set of existing drop buffers. Packets to be dropped are dropped at the input interface 112.

Figure 2:
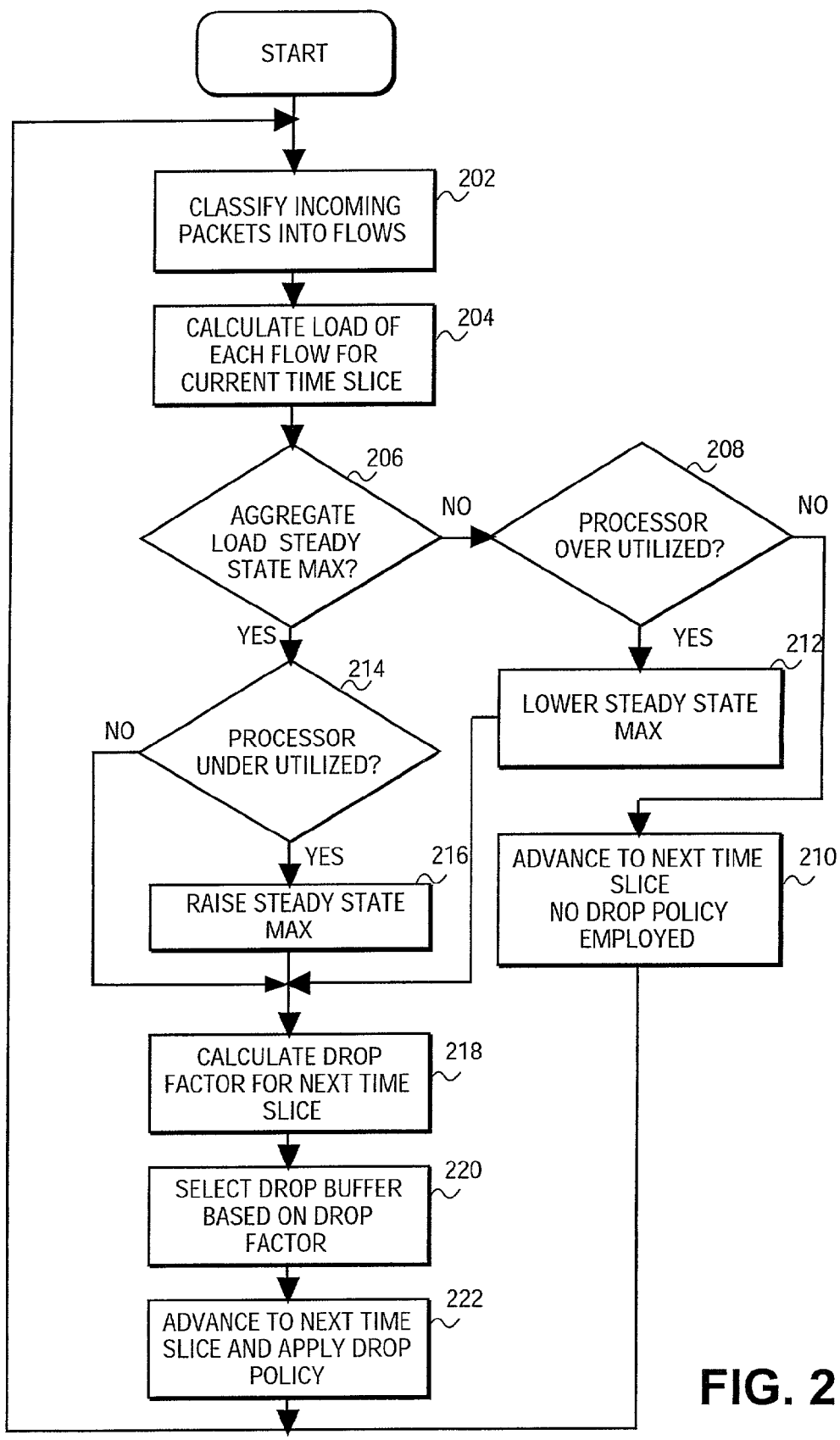
FIG. 2 is a flow diagram of operation of flow control in one embodiment of the invention.

FIG. 2 is a flow diagram of operation of flow control in one embodiment of the invention. At functional block 202, incoming packets are classified into flows. Classification may take the form of grouping packets based on the type of activity to which they are directed, e.g., file serving or internet traffic. At functional block 204, a load of each flow for a current time slice is calculated. In one embodiment, the cost is merely based on a type of incoming packet. In another embodiment, cost may be calculated taking packet length into consideration. In such an embodiment, $C_i = C_o + f_o(l)$ where $C_o$ is the minimum cost for a packet of the particular type and $f_o$ is the function relating packet length to scarce resource usage.

At decision block 206, a determination is made if the aggregate load of all of the flows and exceeds a predicted steady state threshold. At decision block 208, if the aggregate flow does not exceed the steady state threshold, the determination is made if the processor is over utilized. If the processor is not over utilized, the system advances to the next time slice and no drop policy is employed at functional block 210. In one embodiment, a time slice is 200 ms, other embodiments may employ longer or shorter time slices. If the load is greater than the steady state threshold at decision block 206, at decision block 214 a determination is made if the processor is under utilized. If the processor is under utilized the steady state threshold is raised to more efficiently use the processor. In one embodiment, there is a range in which the steady state threshold may be established. In one such embodiment, the rate at which the steady state threshold is reduced responsive to over utilization exceeds the rate at which the steady state threshold is fixed and unchangeable after manufacture. In such an embodiment, blocks 212–216 are effectively omitted.

After the steady state threshold is lowered or if at decision block 214 the processor is not under utilized, or after the steady state threshold is raised, a drop policy for the next time slice is calculated at functional block 218. Then at functional block 220, the processor selects an appropriate drop buffer reflecting the drop factor calculated at functional block 218. At functional block 222, the system advances at the next time slice and applies the drop policy reflected in the previously selected drop buffer. Accordingly, the drop policy for a time slice $T_1$ is established based on actual traffic in time slice $T_0$.

Figure 3:
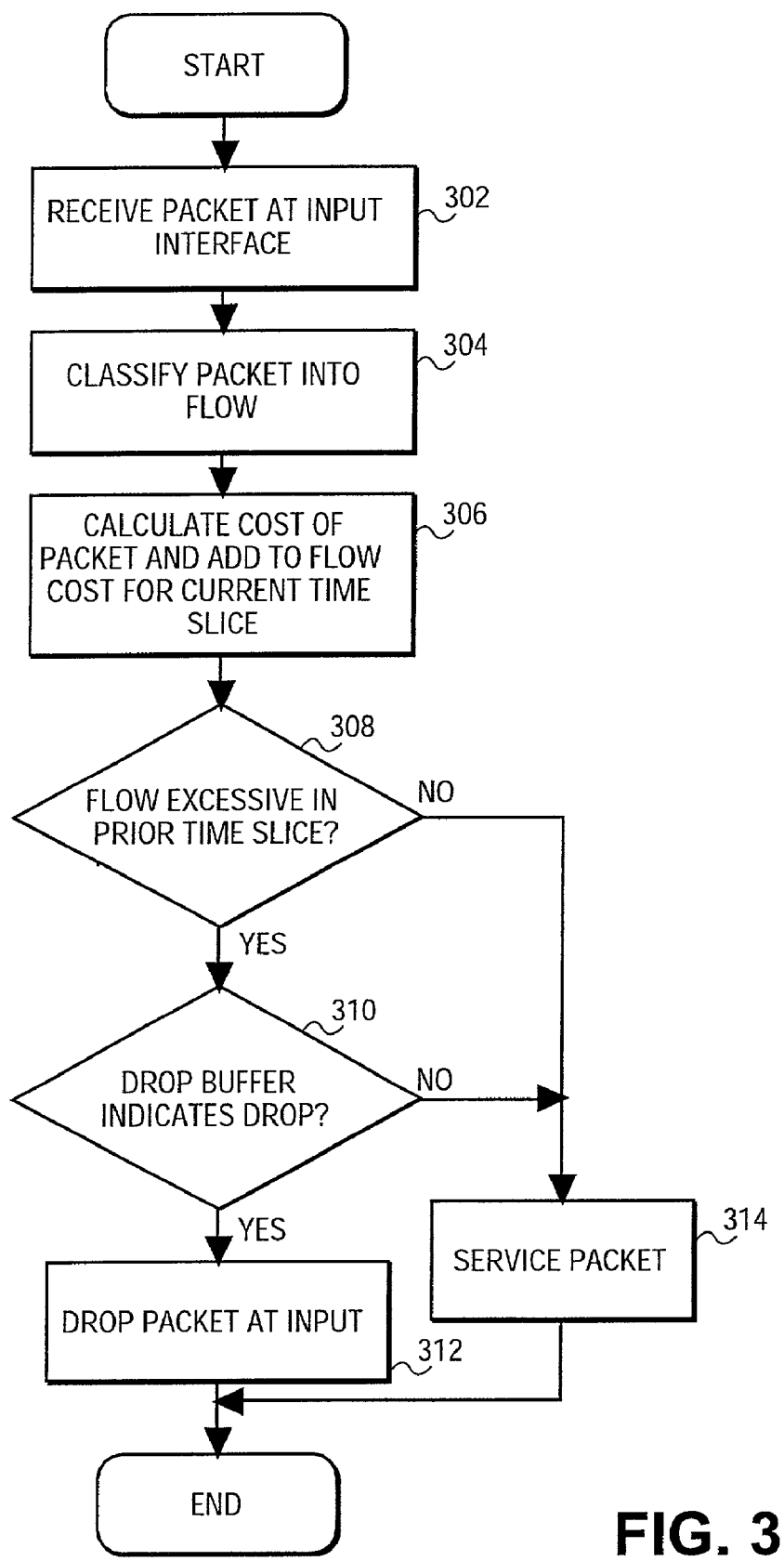
FIG. 3 is a flow diagram of packet handling in one embodiment of the invention.

FIG. 3 is a flow diagram of packet handling in one embodiment of the invention. At functional block 302, a packet is received at the input interface. At functional block 304, the packet is classified into a flow. At functional block 306, the cost of the packet is calculated and added to the cost for the corresponding flow during the current time slice. The determination is made at decision block 308 whether the flow was excessive during the prior time slice. If the flow was excessive, a determination is made whether the drop buffer indicates that the packet should be dropped at functional block 310. If the drop buffer indicates the packet should be dropped, the packet is dropped at the input interface at functional block 312. If the flow was not excessive in the prior time slice, or the drop buffer does not indicate the packet is to be dropped, the packet is serviced at functional block 314.

What is claimed is:

1. A method comprising:
    classifying an incoming packet into one of a plurality of flows;
    determining an estimate of a load of the plurality of flows on a scarce resource, wherein determining comprises aggregating a plurality of normalized flow load estimates for each of the plurality of flows based on at least one of a plurality of cost scaling factors;
    implementing a drop policy for at least one flow when the estimate exceeds a predicted threshold;
    accessing a location in a drop buffer;
    dropping a current packet if the location has a first value;
    serving the current packet if the location has a second value; and advancing a buffer pointer to point to a next buffer location.

2. The method of claim 1 wherein determining further comprises:
aggregating a cost estimate of all packets within a flow to generate a flow load estimate for each flow; and
summing the normalized flow load estimates to yield the total load estimate.

3. The method of claim 1 further comprising:
allocating a portion of the scarce resource to each flow of an expected plurality of flows.

4. The method of claim 3 further comprising:
identifying which flows of the plurality of flows exceed their allocation.

5. The method of claim 4 further comprising:
distributing excess capacity from flows that do not exceed their allocation to those flows that exceed their allocation.

6. The method of claim 1 wherein implementing the drop policy comprises:
computing a drop factor based on aggregate over utilization of a scarce resource; and
enabling the dropping of a packet based on the drop factor.

7. The method of claim 1 wherein the drop policy is established on a flow by flow basis.

8. The method of claim 1 wherein determining comprises:
generating for an incoming packet at least one of the plurality of cost scaling factors based on at least one of packet type and packet length.

9. The method of claim 6, wherein computing the drop factor comprises:
determining a total under utilization by flow not exceeding an expected load on the scarce resource;
adding the total under utilization to an expected load of excessive flows; and
dividing the sum by an offered load of excessive flows.

10. The method of claim 1 further comprising:
decreasing the predicted threshold if the scarce resource is over utilized when the load is equal to the predicted threshold; and
increasing the predicted threshold if the scarce resource is under utilized at the predicted threshold.

11. The method of claim 10 wherein each decrease has a greater absolute value than each increase.

12. A computer readable storage media containing executable computer program instructions which when executed cause a digital processing system to perform a method comprising:
classifying an incoming packet into one of a plurality of flows;
determining an estimate of a load of the plurality of flows on a scarce resource, wherein determining comprises aggregating a plurality of normalized flow load estimates for each of the plurality of flows based on at least one of a plurality of cost scaling factors;
implementing a drop policy for at least one flow when the estimate exceeds a predicted threshold;
accessing a location in a drop buffer;
dropping a current packet if the location has a first value;
serving the current packet if the location has a second value; and
advancing a buffer pointer to point to a next buffer location.

13. The computer readable storage media of claim 12 which when executed cause a digital processing system to perform a method further comprising:
aggregating a cost estimate of all packets within a flow to generate a flow load estimate for each flow; and
summing the normalized flow load estimates to yield the total load estimate.

14. The computer readable storage media of claim 12 which when executed cause a digital processing system to perform a method further comprising:
allocating a portion of the scarce resource to each flow of an expected plurality of flows.

15. The computer readable storage media of claim 14 which when executed cause a digital processing system to perform a method further comprising:
identifying which flows of the plurality of flows exceed their allocation.

16. The computer readable storage media of claim 15 which when executed cause a digital processing system to perform a method further comprising:
distributing excess capacity from flows that do not exceed their allocation to those flows that exceed their allocation.

17. The computer readable storage media of claim 12 which when executed cause a digital processing system to perform a method further comprising:
computing a drop factor based on aggregate over utilization of a processor; and enabling the dropping of a packet based on the drop factor.

18. The computer readable storage media of claim 12 which when executed cause a digital processing system to perform a method further comprising:
the drop policy is established on a flow by flow basis.

19. The computer readable storage media of claim 12 which when executed cause a digital processing system to perform a method further comprising:
generating for an incoming packet at least one of a plurality of cost scaling factors based on at least one of packet type and packet length.

20. The computer readable storage media of claim 17 which when executed cause a digital processing system to perform a method further comprising:
determining a total under utilization by flow not exceeding an expected load on the scarce resource;
adding the total under utilization to an expected load of excessive flows; and
dividing the sum by an offered load of excessive flows.

21. The computer readable storage media of claim 12 which when executed cause a digital processing system to perform a method further comprising:
decreasing the predicted threshold if the scarce resource is over utilized when the load is equal to the predicted threshold; and
increasing the predicted threshold if the scarce resource is under utilized at the predicted threshold.

22. The computer readable storage media of claim 21 wherein each decrease has a greater absolute value than each adjustment upward.

23. An apparatus comprising:
a network input interface; and a processor coupled to the input interface and having a capacity, the processor enabling the actions comprising:
  determining an estimate of a load of plurality of flows on a scarce resource, wherein determining comprises aggregating a plurality of normalized flow load estimates for each of the plurality of flows based on a corresponding one of a plurality of cost scaling factors;
  implementing a drop policy at the input interface for at least one flow when the estimate exceeds a predicted threshold;
  accessing a location in a drop buffer;
  dropping a current packet if the location has a first value;
  serving the current packet if the location has a second value; and
  advancing a buffer pointer to point to a next buffer location.

24. The apparatus of claim 23 further comprising:
a memory coupled to the processor to store a drop buffer, the drop buffer populated to simulate randomization of drop events based on a drop factor.

25. The apparatus of claim 24 wherein the memory stores the drop buffer as a cyclic buffer corresponding to each supported drop factor.

26. The apparatus of claim 23 wherein the processor implements a packet to flow classification algorithm to group incoming packets into flows.

27. The apparatus of claim 23 wherein the threshold is approximately equal to the capacity.

* * * * *

UNITED STATES PATENT AND TRADEMARK OFFICE
CERTIFICATE OF CORRECTION

PATENT NO. : 7,206,282 B1 Page 1 of 1
APPLICATION NO. : 09/870252
DATED : April 17, 2007
INVENTOR(S) : Goldman et al.

It is certified that error appears in the above-identified patent and that said Letters Patent is hereby corrected as shown below:

In column 1, line 31, after "performs" delete ",".

In column 2, line 49, after "$L_2$" insert -- , --.

In column 2, line 53, delete "express" and insert -- expressed --, therefor.

In column 2, line 61, delete "$L_i>P_i$," and insert -- $L_i>P_i$. --, therefor.

In column 4, line 6, after "flows" delete "and".

In column 4, line 22, after "is" insert -- increased responsive to under utilization. In another embodiment, the steady state threshold is --.

Signed and Sealed this

Twelfth Day of June, 2007

JON W. DUDAS
*Director of the United States Patent and Trademark Office*